United States Patent
Hendron et al.

(10) Patent No.: US 7,233,853 B2
(45) Date of Patent: Jun. 19, 2007

(54) MULTIPLE MODE OPERATIONAL SYSTEM FOR WORK VEHICLE BRAKING

(75) Inventors: Scott Svend Hendron, Dubuque, IA (US); Boris Trifunovic, Guttenberg, IA (US); Paul John Ernst, Dubuque, IA (US)

(73) Assignee: Deere & Company, Moline, IL (US)

( * ) Notice: Subject to any disclaimer, the term of this patent is extended or adjusted under 35 U.S.C. 154(b) by 245 days.

(21) Appl. No.: 10/978,057

(22) Filed: Oct. 29, 2004

(65) Prior Publication Data

US 2006/0095186 A1   May 4, 2006

(51) Int. Cl.
  *G05B 15/00* (2006.01)
  *G06F 7/70* (2006.01)
(52) U.S. Cl. ............................ 701/50; 700/83; 700/85
(58) Field of Classification Search .................. 701/50; 700/83, 85
   See application file for complete search history.

(56) References Cited

U.S. PATENT DOCUMENTS

| | | | |
|---|---|---|---|
| 5,489,005 A | 2/1996 | Marcott et al. | 180/134 |
| 5,497,692 A | 3/1996 | Marcott | 91/523 |
| 5,520,262 A | 5/1996 | Marcott | 180/418 |
| 6,067,782 A | 5/2000 | Dickhans | 56/10.2 A |
| 6,354,023 B1 * | 3/2002 | Trahan et al. | 37/219 |
| 6,488,112 B1 | 12/2002 | Kleist | 180/403 |
| 7,010,367 B2 * | 3/2006 | Koch et al. | 700/85 |
| 2002/0138187 A1 | 9/2002 | Qiu et al. | 701/44 |

* cited by examiner

*Primary Examiner*—Mark Hellner

(57) ABSTRACT

A work vehicle includes a multiple mode operational system having a work system such as a linkage and associated hydraulic cylinders of a backhoe, a braking system and a multiple mode control system. The multiple mode control system includes a central controller, a mode toggle switch and a work system control device such as an electromechanical joystick. The central controller is capable of entering at least a first operational mode and a second operational mode. In the first operational mode, the central controller manipulates the work system based on signals received from the work system control device. In the second operational mode, the central controller controls the braking system based on signals received from the work system control device.

19 Claims, 6 Drawing Sheets

MULTIPLE MODE OPERATIONAL SYSTEM FOR WORK VEHICLE BRAKING

FIELD OF THE INVENTION

The invention relates generally to a system for steering, propulsion and braking for a work vehicle and, more particularly, to a multiple mode system allowing the steering, propulsion and braking to be controlled by a first set of control devices in a first operational mode and an alternate control device in a second operational mode.

BACKGROUND OF THE INVENTION

In most conventional loader backhoes, the vehicle is positioned for backhoe work operations and operations are begun. Any subsequent movement of the vehicle to, for example, make fine adjustments as the backhoe operation progresses will, generally, require the operator to disengage the backhoe equipment and manipulate the position of the vehicle through the steering, propulsion and braking systems via the steering wheel, the accelerator pedal and the brake pedal, respectively. Such an adjustment method requires the operator to actually turn his seat away from the backhoe operations.

SUMMARY OF THE INVENTION

Described herein is a system and method of controlling the motion of a vehicle in two operating modes. In the first operational mode, the vehicle motion is controlled via the conventional control devices, i.e., the accelerator pedal, the steering wheel and the brake pedal. In the second operational mode, the vehicle motion is controlled by an alternate control device such as a joystick.

The specific system herein described is electrohydraulic and the alternate control device is a singular electromechanical joystick. A mode switch allows the vehicle control operating mode to be switched at the operator's convenience. Such an arrangement allows the motion of the vehicle to be controlled by the same device used to control a work implement, i.e., a device used to control the backhoe functions such as the electromechanical joystick. Thus, minor adjustments in vehicular position are possible without a change in the overall orientation of the operator or the operator seat. Such could result in time savings as well as an overall increase in operator endurance and satisfaction.

BRIEF DESCRIPTION OF THE DRAWINGS

The invention will be described in detail, with references to the following figures, wherein.

DESCRIPTION OF THE PREFERRED EMBODIMENT

Figure 1:
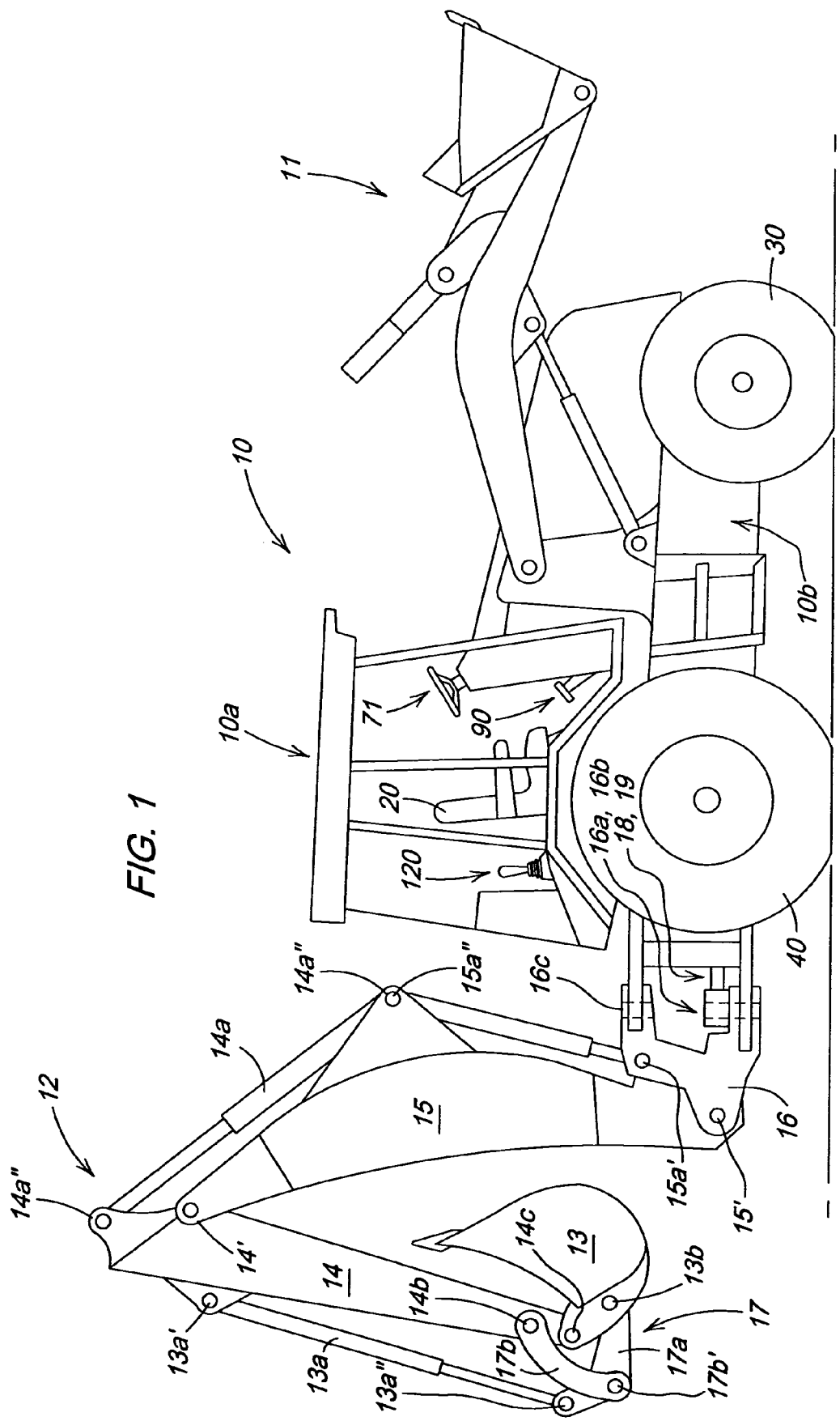
FIG. 1 is a view of a work vehicle in which the invention may be used.

FIG. 1 illustrates a work vehicle in which the invention may be used. The particular work vehicle illustrated is a backhoe 10 having a cab 11, a frame 12, front wheels 30, rear wheels 40, a steering wheel assembly 71, a brake assembly 90, a joystick assembly 220, a loader assembly 11 and a backhoe assembly 12.

The backhoe assembly includes an implement or bucket 13, a dipperstick 14, a boom 15, a swing frame 16, a bucket cylinder 13a, a dipperstick cylinder 14a, a boom cylinder 15a and swing cylinders 16a and 16b. The bucket 13 is operatively connected to the dipperstick 14 via bucket pivot assembly 17 and the bucket cylinder 13a while the dipperstick is operatively connected to the boom 15 via pivot 14', pivot 14a" and the dipperstick cylinder 14a. The boom 15 is operatively connected to the swing frame 16 via pivots 15', 15a", and the boom cylinder 15a. The swing frame 16 is operatively connected to the vehicle frame 10b via pivots 16a', 16b', 16c and the swing cylinders 16a and 16b. The bucket cylinder 13a is pivotally connected to the dipperstick 14 at pivot 13a' and pivotally connected to the bucket pivot assembly 17 at 13a". The dipperstick cylinder 14a is pivotally connected to the boom 15 at pivot 14a' and pivotally connected to the dipperstick 14 at pivot 14a". The boom cylinder 15a is pivotally connected to the swing frame 16 at pivot 15a" and pivot 15a". Finally, the swing cylinders 16a and 16b are pivotally connected to the swing frame 16 at pivots 16a' and 16b' respectively and connected to the vehicle frame 10b at 16a" and 16b", respectively.

The bucket pivot assembly includes a bucket crank 17a and a pivot link 17b. The bucket crank 17a is pivotally connected to the bucket cylinder 13a at the pivot 13a", pivotally connected to the bucket at the pivot 13b, and pivotally connected to the pivot link 17b at pivot 17b' located between the pivot 13a" and the pivot 13b. Finally, the pivot link 17b is pivotally connected to the dipperstick 14 at pivot 14b.

In operation, pitching motions of the bucket, relative to the vehicle frame, are effected by controlling at least one of the bucket cylinder 13a, the dipperstick cylinder 14a, and the boom cylinder 15a. Swinging motions of the bucket are effected by controlling swing cylinders 16a and 16b.

Figure 2:
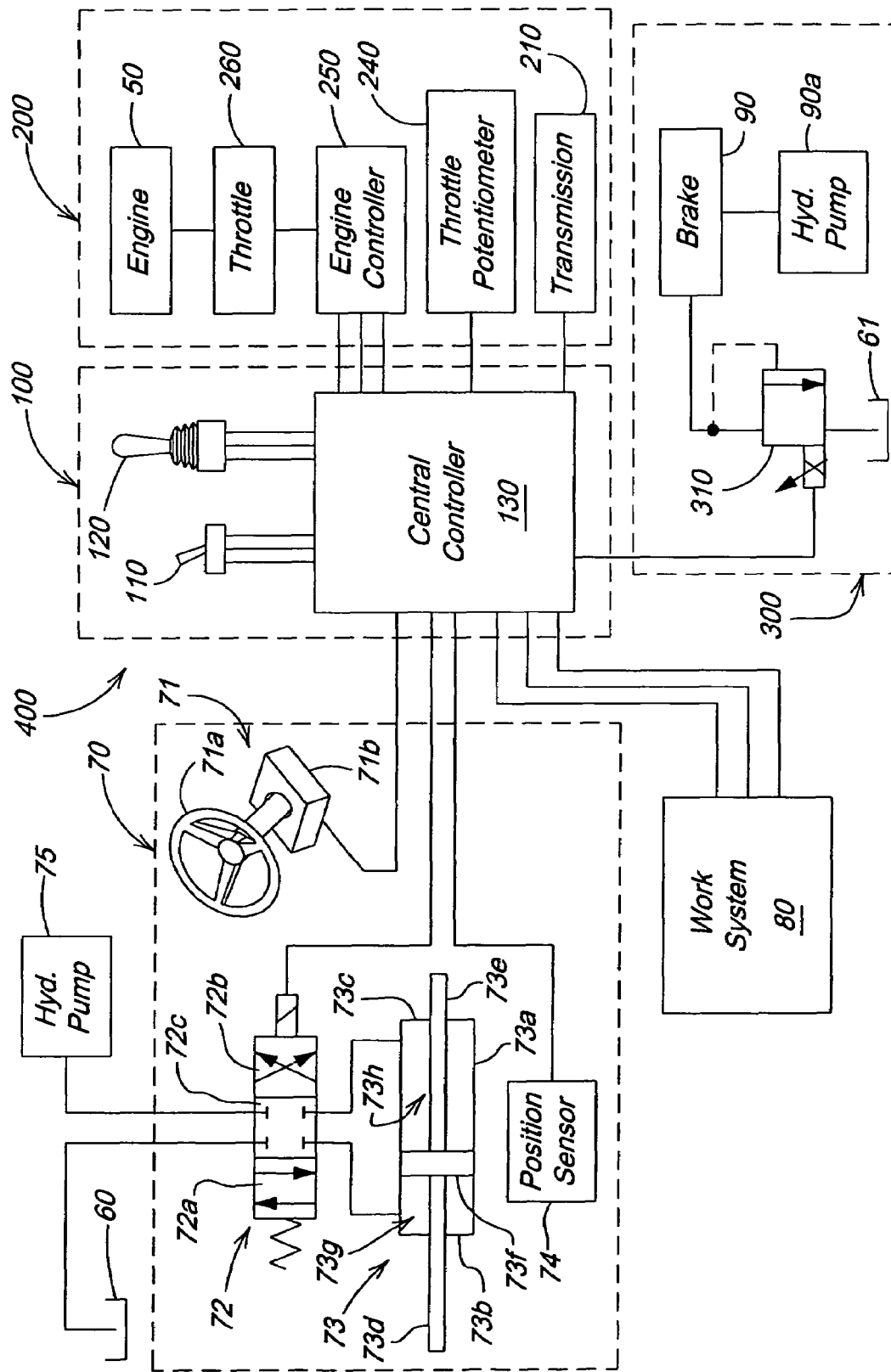
FIG. 2 is a diagram of an exemplary embodiment of the dual mode propulsion, braking and steering systems of the invention.
Figure 3:
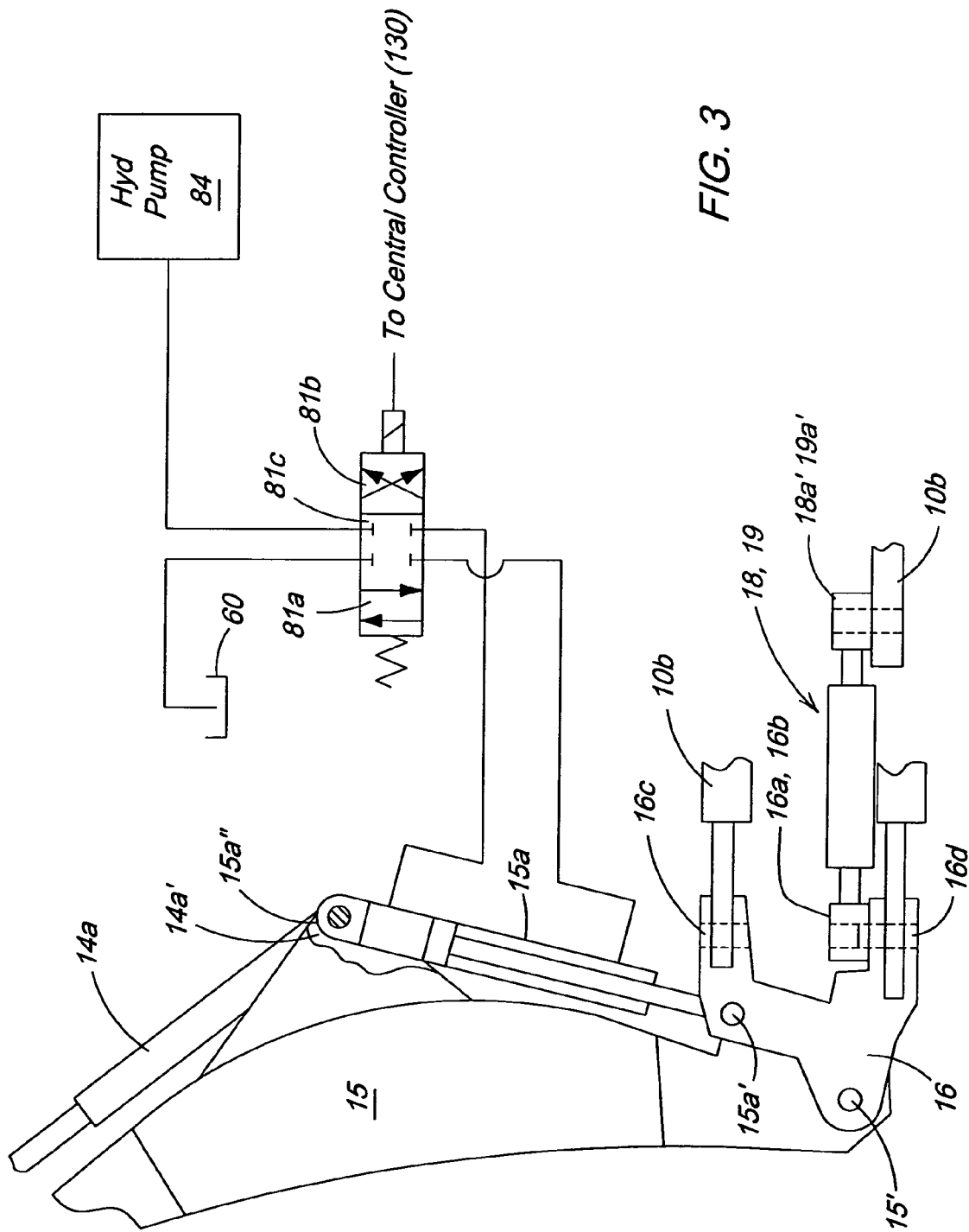
FIG. 3 is a side view of a portion of the working system of the loader backhoe.
Figure 4:
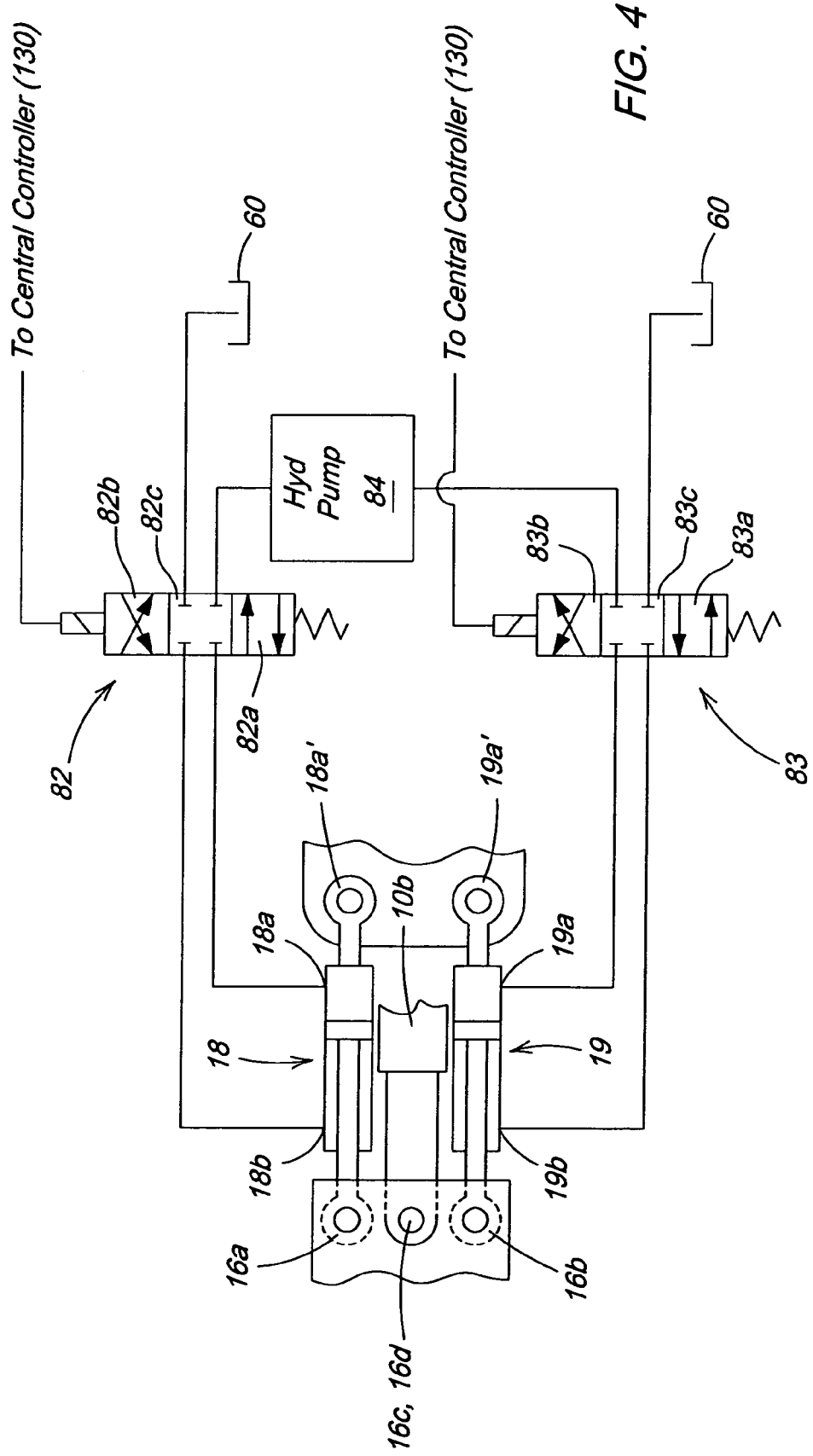
FIG. 4 is a top view of the portion of the working system illustrated in FIG. 3.

FIG. 2 illustrates an exemplary embodiment of a multiple mode operational system 400 for the loader backhoe 400 of the invention which includes: a steering system 70, a work system 80, a multiple mode control system 100, a propulsion system 200, and a braking system 300.

The multiple mode control system 100 includes a mode toggle switch 110, an electromechanical joystick 120 and a central controller 130. The mode toggle switch 110 may be any of a number of conventional toggle switches and is capable of achieving at least a first state and a second state. The central controller 130 is an electrical device capable of entering at least a first operational mode and a second operational mode and may be hardwired, electronically programmable or a mixture of hardwired and electronically programmable. In this embodiment, the central controller 130 is fully electronically programmable.

The first state of the mode toggle switch 110 directs the central controller 130 to enter the first operational mode while the second state of the mode toggle switch 110 directs the central controller 130 to enter the second operational mode. The first operational mode directs the central controller to send electrical signals to control each of the steering system 70, work system 80 and propulsion system 200 based on electrical signals received from conventional devices that normally control these systems. The second operational mode directs the central controller 130 to lock the work system 80 and to send electrical signals to control each of the steering system 17, the propulsion system 200 and the braking system 300 based on electrical signals received from the electromechanical joystick 120.

The steering system 70 controls the direction of the backhoe 400 by manipulating the front wheels 30 and includes: the steering wheel assembly 71; a pressure source for hydraulic fluid which is, in this case, a hydraulic pump 75; a fluid reservoir 60; an electrohydraulic steering valve 72; a double sided hydraulic steering cylinder 73; and a conventional angular position sensor 74. The steering system 70 also includes the multiple mode control system 100.

The steering wheel assembly 71 includes a steering wheel 71a and an angle sensor 71b which senses the angular position of the steering wheel 71a. The steering wheel assembly 71 is mounted in the cab 11 and the angle sensor 71b is electrically connected to the central controller 130.

The hydraulic steering cylinder 73 includes a cylindrical wall 73a, a first end wall 73b, a second end wall 73c, a first steering rod 73d, a second steering rod 73e and a steering piston 73f with a first piston wall 73f' and a second piston wall 73f''. The steering piston 73f is physically connected to the first steering rod 73d and the second steering rod 73e on the first and second piston walls 73f', 73f'' respectively. A first steering chamber 73g is formed by the first piston wall 73f', the first end wall 73b and the cylinder wall 73a between the first piston wall 73f' and the first end wall 73b. The second steering chamber 73h is formed by the second piston wall 73f'', the second end wall 73c and the cylinder wall 73a between the second piston wall 73f'' and the second end wall 73c. Naturally the size of each of the first and second chambers 73f, 73g changes as the steering piston 73f slides along the length of the hydraulic steering cylinder 73.

Longitudinal movement of the steering piston 73f extends one of the first and second steering rods 73d, 73e while simultaneously retracting another of the first and second steering rods 73d, 73e. The angular position sensor 74 directly or indirectly senses the real time angular steering positions of the front wheels 30 and conveys this information to the programmable controller 130 as feedback which indicates the positions of the first and second steering rods 73d, 73e.

The electrohydraulic steering valve 72 is a four port valve with three positions, i.e., first, second and third steering valve positions 72a, 72b, 72c. The third steering valve position 72c closes the valve, preventing oil flow across any of the four ports; effectively preventing movement of the steering piston 73f within the hydraulic steering cylinder 73 and, thusly, preventing any change in the angular steering position of the front wheels 30. The first steering valve position 72a allows pressurized fluid to enter into the first steering chamber 73g while simultaneously allowing fluid to leave the second steering chamber 73h. This action causes the steering piston 73f to move in a first direction, thus, moving the front wheels 30 in a first angular direction. The second steering valve position 72b allows pressurized fluid to enter into the second steering chamber 73g while simultaneously allowing fluid to leave the second steering chamber 73f. This action causes the steering piston 73f to move in a second direction, thus, moving the front wheels 30 in a second angular direction.

During the first operational mode, the central controller 130 directs the electrohydraulic steering valve 72 via controlling electrical signals based electrical signals received from the angle sensor 71b. During the second operational mode, the central controller uses only signals received from the electromechanical joystick 120 to direct the electrohydraulic steering valve 72 via controlling electrical signals.

The work system 80 in this particular embodiment of the invention encompasses only a portion of the backhoe assembly 12 and includes: the boom 15, the swing frame 16, electrohydraulic work valves 81, 82 and 83; hydraulic work cylinders 15a, 18 and 19; a high pressure hydraulic fluid source, i.e., a hydraulic work pump 84; and the fluid reservoir 60. Also included in the work system 80 is the electronic joystick 120 and the central controller 130. The electromechanical joystick 120, the steering and the electrohydraulic work valve 81 are electrically connected to the central controller 130. Movements of the joystick 120 cause the joystick 120 to send electronic signals to the central controller 130. During the first operation mode, the central controller 130 uses signals from the electromechanical joystick 120 to generate appropriate electrical signals to the electrohydraulic work valves 81, 82 and 83 to direct actions of the hydraulic work cylinders 15a, 18 and 19 respectively. The hydraulic work cylinders 15a, 18 and 19 control all manipulations of the boom 15 and swing cylinder 16.

The hydraulic work cylinders 15a, 18 and 19 include first cylinder ports 15a', 18a and 19a, respectively, and second cylinder ports 15a'', 18b and 19b respectively. Application of a first fluid pressure to any of the first cylinder ports 15a', 18a and 19a causes the respective hydraulic work cylinder to extend if a second fluid pressure at the corresponding second cylinder port is lower than the first fluid pressure. Similarly, application of the second fluid pressure to any of the second cylinder ports 15a'', 18b and 19b causes the respective hydraulic work cylinder to retract if the first fluid pressure at the corresponding first cylinder port is lower than the second fluid pressure. The extension and retraction of hydraulic work cylinder 15a causes the boom 15 to rotate about pivot 15' in a pitching motion in the direction of arrow P while the alternate extension and retraction of the hydraulic work cylinders 18 and 19 cause a yaw or swinging movement of the boom 15 and swing frame 16 in the direction of arrow S.

The electrohydraulic work valve 81 includes four ports and three work positions, i.e., first, second, and third work positions 81a, 81b, 81c. The third work position 81c effectively stops fluid flow across the four ports; preventing fluid flow from or to each of the first and second cylinder ports 15a', 15a''. The first work position 81a allows pressurized hydraulic fluid to enter the first cylinder port 15a' while, simultaneously, allowing fluid to leave the second cylinder port 15a'' and return to the fluid reservoir 60. These particular actions cause the hydraulic work cylinder 15a to extend and cause the boom 15 and, ultimately, the work implement 13 to move in a first pitching direction along the arrow P. The second work position 81b allows pressurized hydraulic fluid to enter the second cylinder port 15a'' while simultaneously allowing fluid to leave the first cylinder port 15a' and return to the fluid reservoir 60. These particular actions cause the hydraulic work cylinder 15a to retract. Retraction of hydraulic work cylinder 15a causes the boom 15 and, ultimately, the work implement 13 to move in a second pitching direction along the arrow P.

Each of the electrohydraulic work valves 82, 83 include four ports and three work positions, i.e., they, respectively, include work positions 82a, 82b, 82c and 83a, 83b, 83c.

Work positions 82c and 83c blocks hydraulic fluid from flowing past cylinder ports 18a, 18b, 19a and 19b, effectively holding the swing frame 16 in place. Simultaneous shifting to work positions 82a and 83b causes the swing frame to swing in a first yaw direction along the arrow S while simultaneous shifting to work positions 82b and 83a causes the swing frame to swing in a second yaw direction along the arrow S.

During the first operation mode, the central controller 130 directs the electrohydraulic work valves 81, 82, 83 based on signals received from the electromechanical joystick. Thus, during the first operation mode, the electromechanical joystick 120 controls all relative motions of the boom 15. When the central controller 130 enters the second operational mode, the central controller 130 directs the electrohydraulic work valves to assume work positions 81c, 82c and 83c, effectively locking the boom 15 in place. No other signals are sent to the electrohydraulic work valves 81, 82, 83 during the second operational mode operations.

The propulsion system 200, shown in FIG. 2, includes an engine 50, an electronic input throttle 260, an engine controller 250, a conventional electro-mechanical throttle 240, an electronically controlled transmission 210. Also included are: the electro-mechanical joystick 120, the mode control switch 110 and the central controller 130. The engine controller 250, the electro-mechanical output throttle 240, the electronically controlled transmission 210, the mode control switch 110 and the electro-mechanical joystick 120 are electrically connected to the central controller 130.

During the first operation mode of the propulsion system 200, manipulations of the electromechanical input throttle 240 cause the electro-mechanical output throttle 240 to emit electrical signals to the central controller 130 resulting in the central controller 130 interpreting those signals and, accordingly, sending appropriate control signals to the engine controller 250. The engine controller 250 then sends electrical signals to the output throttle 260 directing the output throttle 260 to increase or decrease engine output in accordance with the demand signaled by the electro-mechanical input throttle 240. Further, operator manipulation of the electromechanical transmission controls 215 cause the electromechanical transmission controls 215 to send electrical signals to the central controller 130. The central controller 130 then sends electrical signals to the electronically controlled transmission 215 to enter an appropriate gear or state indicated by the signal received from the electromechanical transmission controls 215.

During the second operation mode of the propulsion system 200, the mode control toggle switch 110 is switched to a second operation mode state resulting in electrical signals from the mode control toggle switch 110 to the central controller 130 directing the central controller 130 to ignore signals from the electromechanical input throttle 240 and the electromechanical transmission controls 215 and to use electrical signals received from the electromechanical joystick 120 to control the engine controller 250 and the electronically controlled transmission 240 via electrical signals. Thus, in the second operation mode, engine output and transmission gear shifting are controlled via operator manipulations of the electromechanical joystick 120. In this particular embodiment, second operational mode operation results in the immediate shifting of the transmission to a first direction lowest gear in a first direction of the backhoe 10 and a second direction lowest gear in a second direction of the loader backhoe 10. Further, manipulations of the electromechanical joystick 120 control engine speed and transmission shifting between the first direction and a second direction of the backhoe 10.

Figure 5:
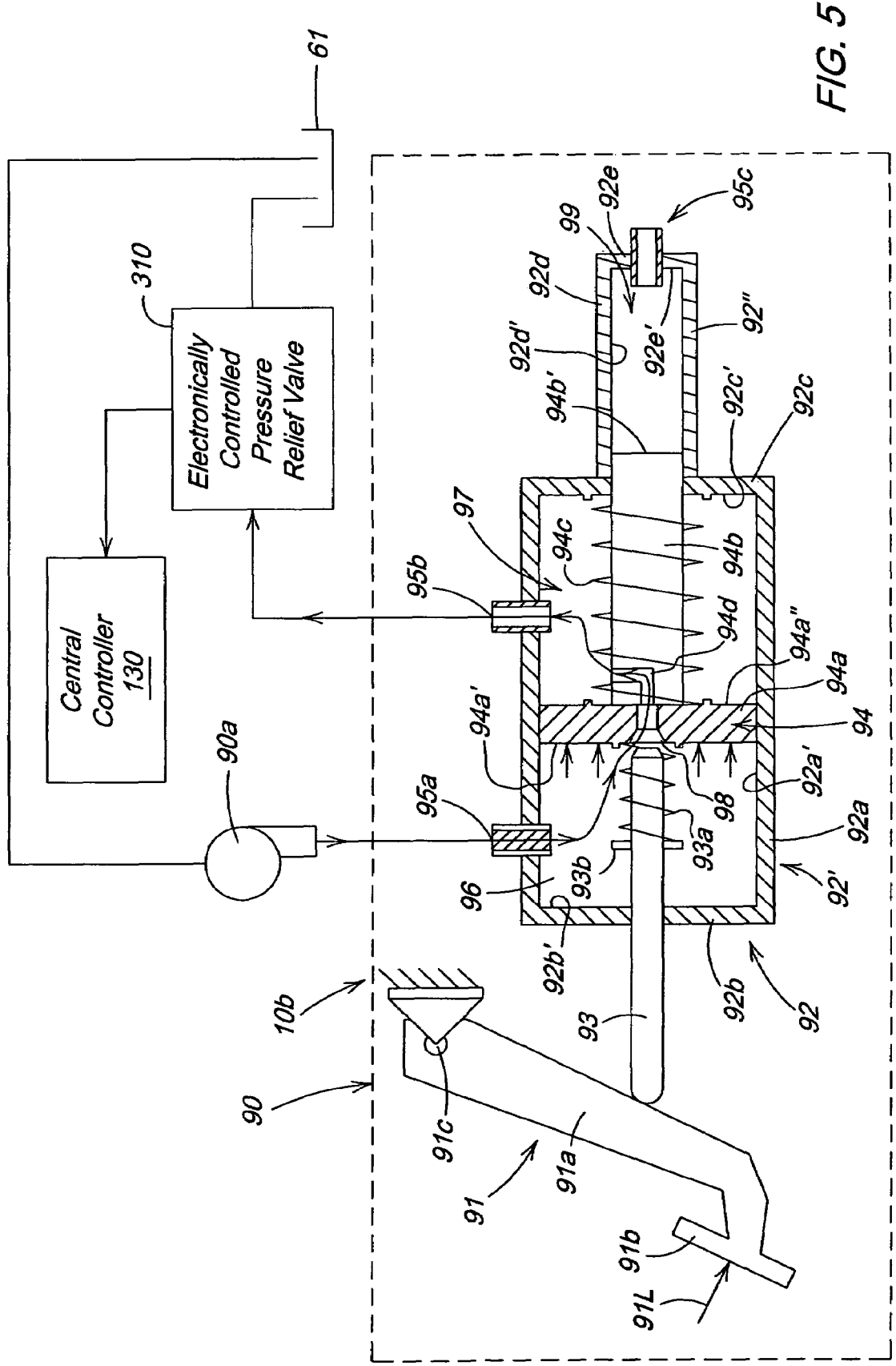
FIG. 5 is a diagram of the brake valve illustrated in FIG. 2.

The braking system is illustrated in FIGS. 1, 2 and 5 and includes a main brake valve mechanism 90, a low pressure hydraulic pump 90a, an electrohydraulic proportional relief valve 310 and a brake fluid reservoir 61. During second operational mode operations, the braking system also includes the central controller 130, the mode toggle switch 110 and, optionally, the electromechanical joystick 120.

As shown in FIG. 5 the main brake valve mechanism 90 includes a brake pedal assembly 91 and a main brake valve mechanism 92. The brake pedal assembly 91 includes a brake bar 91a and a brake pedal 91b. The brake bar 91a is integral with the brake pedal 91b at a first brake bar end and pivotally attached to the frame 10b at a second brake bar end via a first pivot 91c.

The main brake valve mechanism 92 includes: a first brake housing 92', a second brake housing 92", a brake rod 93, a brake rod return spring 93a, a brake piston assembly 94, a low pressure pilot inlet port 95a, a low pressure pilot outlet port 95b and a high pressure outlet port 95c for a high pressure brake line (not shown). The brake bar 91a physically contacts the brake rod 93 at a first end 93' of the brake rod 93 located between the brake pedal 91b and the first pivot 91c.

The brake piston assembly 94 includes a low pressure piston portion 94a with a first low pressure piston surface 94a' and a second low pressure piston surface 94a"; and a high pressure piston portion 94b integral to the low pressure piston portion 94a. A brake rod return spring 93a is seated between the first surface 94a' and a spring stop 93b integral to the piston rod 93. A piston return spring 94e is situated between the second surface 94a" and an end wall 92a' of the first brake housing 92'.

The first brake housing 92' includes a first cylindrical portion 92a having a first cylindrical internal surface 92a', a first end 92b having a first end internal surface 92b', a second end 92c having a second end internal surface 92c'. The first cylindrical internal surface 92a', the first low pressure piston surface 94a' and the first end internal surface 92b' form a first low pressure chamber 96 for the first housing 92'. The first cylindrical internal surface 92a', the second low pressure piston surface 94a" and the second end internal surface 92c' form a second low pressure chamber 97 for the first housing 92'. Naturally the volume of each of the first and second low pressure chambers 96 and 97, respectively, change as the low pressure piston portion 94a slides along the first cylindrical internal surface 92a'.

The low pressure hydraulic pump 90a is in fluid communication with the brake fluid reservoir 61 and the pilot inlet port 95a. The electrohydraulic proportional relief valve 310 is in fluid communication with the low pressure pilot outlet port 95b and the brake fluid reservoir 61.

The second brake housing portion 92" includes a cylindrical wall 92d with an inner cylindrical surface 92d' and a high pressure end wall 92e with an internal high pressure end wall 92e'. A high pressure surface 94b' of the high pressure piston portion 94b, the internal high pressure end wall 92e' and the high pressure inner cylindrical surface 92d' form a high pressure chamber 99.

The electrohydraulic proportional relief valve 310 is open by default, allowing fluid to freely pass from the low pressure outlet port 95b to the brake fluid reservoir 61 with minimal restriction. Thus, the main brake valve mechanism 90 is open by default, i.e., when the vehicle is running and the brake pedal 91b is not depressed as a gap 98 exists between the low pressure piston 94 and the brake rod 93. Under these circumstances, fluid passes from the low pressure hydraulic pump 90*a* into the first low pressure chamber 96, via pilot inlet port 95*a*, through low pressure piston hole 94*c*, through high pressure passage 94*d*, into the second low pressure chamber 97, and out of the low pressure pilot outlet port 95*b* with minimal restriction.

As discussed above, during the first operation mode, the brake valve mechanism 90 is open, by default, and a gap 98 exists between the low pressure piston 94 and the brake rod 93 allowing free flow of the brake fluid from the first low pressure chamber 96 to the second low pressure chamber 97. However, when the pedal 91*b* is sufficiently loaded under pedal load 91L, i.e., depressed, resistance from the brake rod return spring 93*a* is overcome and the brake rod 93 slides forward to close the gap 98. Once the gap 98 is closed, fluid flow through the low pressure piston hole 94*c* is blocked and fluid pressure on the first low pressure piston surface 94*a* begins to increase relative to the fluid pressure on the second low pressure piston surface 94*a*" as brake fluid continues to flow into the first low pressure chamber 96 pilot inlet port 95*a*. Thus, the low pressure fluid in the first low pressure chamber 96 provides a load on the piston assembly, in addition to the pedal load 91L, and thereby adds to or assists the pedal load 91L in overcoming a piston return spring 94*e* and braking the loader backhoe 10. A movement of the low pressure piston portion 94 under a low fluid pressure allows a movement of the high pressure piston portion 94*b* under a much higher fluid pressure in high pressure chamber 99 as the exposed area of the high pressure piston portion, i.e., high pressure piston surface 94*b*' is smaller than the exposed area of the first low pressure piston surface 94*a*'.

During the second operation mode, pedal depression is not required to create a load differential between the first low pressure piston surface 94*a*' and the second low pressure piston surface 94*a*". A load differential is created between the first and second low pressure piston surfaces 94*a*' and 94*a*" by proportionally closing the electrohydraulic proportional relief valve 310 to restrict the flow of pilot fluid enough to build up an internal pressure in the first and second low pressure chambers sufficient to overcome a load from the piston return spring 94*e* plus a required pressure in high pressure chamber 99 for stoppage of the backhoe 10. The load differential is caused by the action of the fluid pressure on the first and second low pressure areas where the exposed area of the first low pressure surface 94*a*' is greater than the exposed area of the second low pressure surface 94*a*". The braking load on the brake piston assembly 94 is equal to the pressure in the internal pressure chambers 96 and 97 times the size difference between the first low pressure surface area 94*a*' and the second low pressure surface area 94*a*". Thus, braking may be effected by the operation of an electronic or an electromechanical switch. In this particular embodiment, the brakes are, by default, fully applied when the mode toggle switch 110 is toggled to the second state and the central controller 130 enters the second operational mode.

Figure 6:
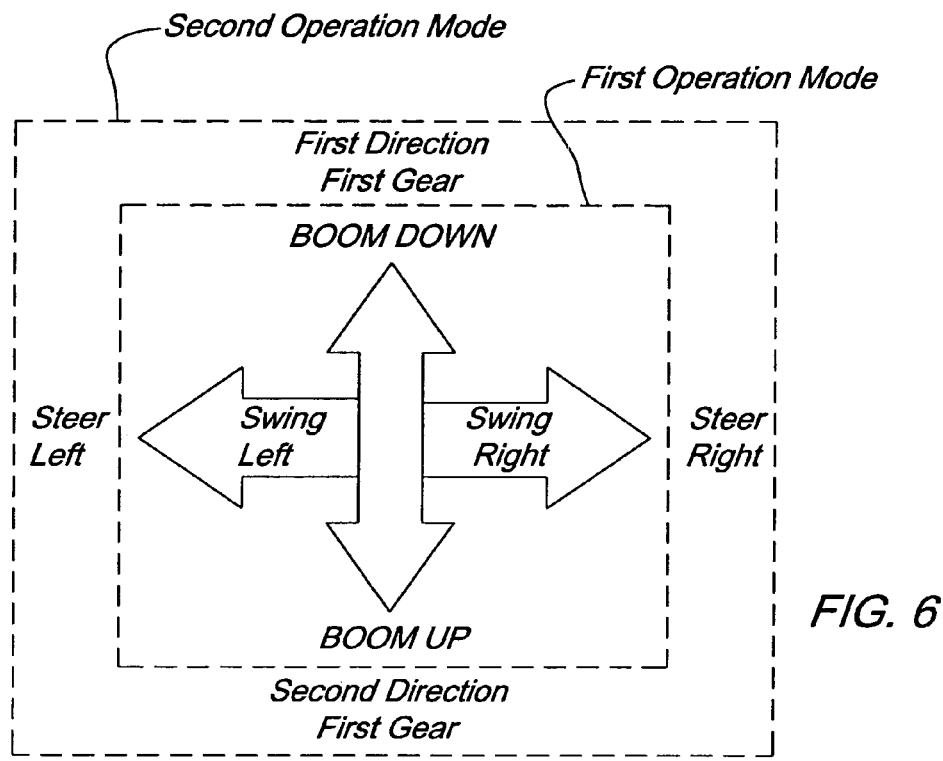
FIG. 6 is a diagram of an exemplary embodiment of the dual mode functions of the electromechanical illustrated in FIG. 2.

FIG. 6 shows backhoe operations controlled via the electromechanical joystick 120 for this particular embodiment of the invention during the first and second operation modes. As illustrated in FIG. 6, during the first operation mode, manipulations of the electromechanical joystick 120 effect movements of the boom 15. Manipulations of the same electromechanical joystick 120 during the second operation mode effect braking, steering and propulsion in the first vehicle direction and the second vehicle direction. All backhoe control from the manipulation of the electromechanical joystick 120 is effected via electrical signals from the electromechanical joystick 120 to the central controller 130. The central controller 130 then effects braking, propulsion and steering via electrical signals to the electrohydraulic proportional relief valve 310; electrical signals to the electronically controlled transmission 210 and engine controller 250; and electrical signals to the electrohydraulic steering valve 72. Braking is fully applied at a neutral position of the electromechanical joystick 120 and lessens only with joystick manipulations resulting in signals or commands for the propulsion of the loader backhoe 10.

Figure 7:
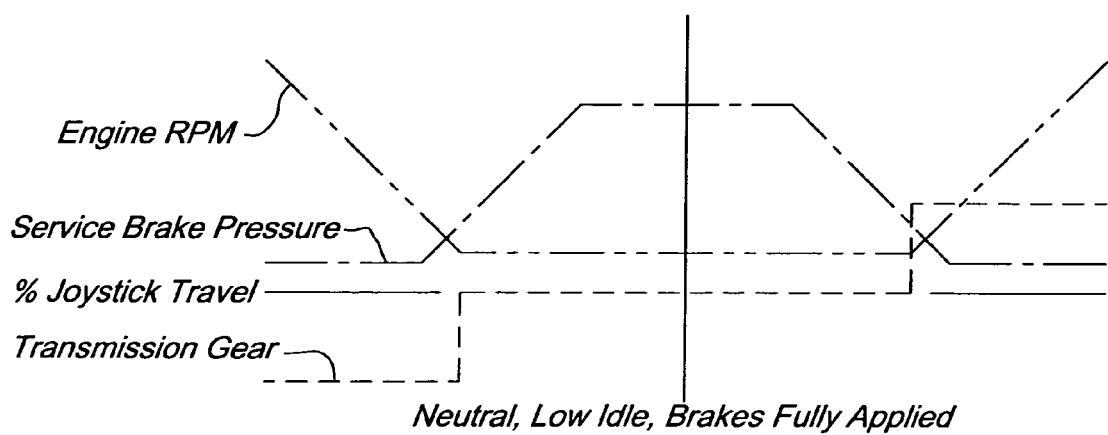
FIG. 7 is a diagram illustrating an exemplary embodiment of the functioning of the invention.

As illustrated in FIG. 7, during the second operational mode operation of the backhoe 10, braking pressure lessens with joystick travel in either the first direction or the second direction and approaches minimal pressure when revolutions per minute (RPM) for the engine 50 start to increase from a RPM at idle while the transmission 210 is engaged in a gear for propulsion in the first direction or second directions. The purpose of this is to avoid undue application of propulsive energy against unnecessary braking forces. Braking pressure approaches a minimal value as the transmission 210 is engaged for vehicle movement and the RPM and torque of the engine 50 increase from minimal values. Naturally, the curves illustrated in FIG. 5, i.e., vehicular response to manipulations of the electromechanical joystick 120 may be modified by altering the manner in which the central controller 130 interprets the signals received from the electromechanical, i.e., altering the signals transmitted from the central controller 130 in response to the signals received from the electromechanical joystick 120. Thus changes may be effected by modifying the programming of the central controller 130 when the central controller is programmable.

Having described the preferred embodiment, it will become apparent that various modifications can be made without departing from the scope of the invention as defined in the accompanying claims.

The invention claimed is:

1. A multiple mode operational system for a work vehicle, the multiple mode operational system comprising:
  a power system including a braking system and a work system; and
  a multiple mode control system including a work system control device and a central controller receiving signals from the work system control device, the central controller having a first operational mode and a second operational mode, the first operational mode allowing the signals from the work system control device to control the work system, the second operational mode allowing the signals from the work system control device to control the braking system.

2. The multiple mode operational system of claim 1, wherein the work system control device comprises an electromechanical joystick.

3. The multiple mode operational system of claim 1, wherein the braking system comprises a pilot pressure assist brake valve including an inlet for low pressure fluid from a low pressure pilot source, an outlet for the low pressure fluid and an electrohydraulic proportional relief valve fluidly connected to the outlet.

4. The multiple mode operational system of claim 3, wherein the pilot pressure assist brake valve applies braking pressure when the electrohydraulic proportional relief valve closes to prevent the low pressure fluid flow from the outlet.

5. The multiple mode operational system of claim 3, wherein the pilot pressure assist brake valve relieves braking pressure when the electrohydraulic proportional relief valve opens to allow the low pressure fluid flow from the outlet.

6. The multiple mode operational system of claim 3, wherein the second operational mode causes the central controller to control the electrohydraulic proportional relief valve based on the signals received from the work system control device.

7. A work vehicle, having a multiple mode operational system comprising:
   a power system including a braking system and a work system; and
   a multiple mode control system including a work system control device and a central controller receiving signals from the work system control device, the central controller having a first operational mode and a second operational mode, the first operational mode allowing the signals from the work system control device to control the work system, the second operational mode allowing the signals from the work system control device to control the braking system.

8. The work vehicle of claim 7, wherein the work system control device comprises an electromechanical joystick.

9. The work vehicle of claim 8, wherein the braking system comprises a pilot pressure assist brake valve including an inlet for low pressure fluid from a low pressure pilot source, an outlet for the low pressure fluid and an electrohydraulic proportional relief valve fluidly connected to the outlet.

10. The work vehicle of claim 9, wherein the pilot pressure assist brake valve applies braking pressure to the brake cylinder when the electrohydraulic proportional relief valve closes to prevent the low pressure fluid flow from the outlet.

11. The work vehicle of claim 9, wherein the pilot pressure assist brake valve relieves pressure to the brake cylinder when the electrohydraulic proportional relief valve opens to allow the low pressure fluid flow from the outlet.

12. The work vehicle of claim 9, wherein the second operational mode causes the central controller to control the electrohydraulic proportional relief valve based on the signals received from the work system control device.

13. A method of controlling a work vehicle, the work vehicle including: a power system including a braking system and a work system including an electrohydraulic work valve and a work cylinder, the electrohydraulic work valve operatively connected to the hydraulic work cylinder, and a multiple mode control system including a work system control device and a central controller receiving signals from the work system control device, the central controller having a first operational mode and a second operational mode, the central controller being operatively connected to the electrohydraulic work valve and the electrohydraulic proportional relief valve, the method comprising:
   generating the signals by manipulating the work system control device to control the electrohydraulic work valve in the first operational mode; and
   generating the signals by manipulating the work system control device to control the electrohydraulic proportional relief valve in the second operational mode.

14. The multiple mode operating system of claim 1, wherein the work system is locked in the second mode.

15. The work vehicle of claim 7, wherein the work system is locked in the second mode.

16. A multiple mode operational system for a work vehicle, the multiple mode operational system comprising:
   a work system;
   a braking system including a pilot pressure assist brake valve with an inlet for low pressure fluid from a low pressure pilot source, an outlet for the low pressure fluid, an electrohydraulic proportional relief valve fluidly connected to the outlet a brake fluid reservoir and a low pressure piston with a first pressure surface and a second pressure surface, the first pressure surface having a greater surface area than the second pressure surface; and
   a multiple mode control system including a work system control device and a central controller receiving signals from the work system control device, the central controller having a first operational mode and a second operational mode, the first operational mode allowing the signals from the work system control device to control the work system, the second operational mode allowing the signals from the work system control device to control the braking system, the central controller applying braking power by proportionally closing the electrohydraulic proportional relief valve to generate a sufficient pressure differential between the first pressure surface and the second pressure surface.

17. The multiple mode operational system of claim 16, wherein the central controller releases the braking power by opening the electrohydraulic proportional relief valve.

18. A work vehicle, having a multiple mode operational system comprising:
   a work system;
   a braking system including a pilot pressure assist brake valve with an inlet for low pressure fluid from a low pressure pilot source, an outlet for the low pressure fluid, an electrohydraulic proportional relief valve fluidly connected to the outlet a brake fluid reservoir and a low pressure piston with a first pressure surface and a second pressure surface, the first pressure surface having a greater surface area than the second pressure surface; and
   a multiple mode control system including a work system control device and a central controller receiving signals from the work system control device, the central controller having a first operational mode and a second operational mode, the first operational mode allowing the signals from the work system control device to control the work system, the second operational mode allowing the signals from the work system control device to control the braking system, the central controller applying braking power by proportionally closing the electrohydraulic proportional relief valve to generate a sufficient pressure differential between the first pressure surface and the second pressure surface.

19. The work vehicle of claim 18, wherein the central controller releases the braking power by opening the electrohydraulic proportional relief valve.

* * * * *